US011270547B2

(12) United States Patent
Tsai et al.

(10) Patent No.: US 11,270,547 B2
(45) Date of Patent: Mar. 8, 2022

(54) CONTACTLESS GAME CONTROLLER

(71) Applicant: Feiloli Electronic Co., Ltd., Changhua County (TW)

(72) Inventors: Chi-Ming Tsai, Hemei Town (TW); I-Chiang Yang, Hemei Town (TW)

(73) Assignee: Feiloli Electronic Co., Ltd., Hemei Town (TW)

( * ) Notice: Subject to any disclaimer, the term of this patent is extended or adjusted under 35 U.S.C. 154(b) by 28 days.

(21) Appl. No.: 16/904,746

(22) Filed: Jun. 18, 2020

(65) Prior Publication Data

US 2021/0398384 A1 Dec. 23, 2021

(51) Int. Cl.
*A63F 13/00* (2014.01)
*G07F 17/32* (2006.01)

(52) U.S. Cl.
CPC ...... *G07F 17/3209* (2013.01); *G07F 17/3297* (2013.01)

(58) Field of Classification Search
None
See application file for complete search history.

(56) References Cited

U.S. PATENT DOCUMENTS 7,618,323 B2 * 11/2009 Rothschild .......... G07F 17/3209 463/12
8,413,077 B2 * 4/2013 Yamamoto ............. G08C 17/00 715/863
9,895,606 B1 * 2/2018 Kamata ................. A63F 13/285
10,751,613 B1 * 8/2020 Tamura .................... A63F 13/98
2013/0023337 A1 * 1/2013 Bowers ............... G07F 17/3209 463/25
2014/0324197 A1 * 10/2014 Mizuno .................. G08C 17/00 700/83
2015/0235505 A1 * 8/2015 Keilwert ............. G07F 17/3211 463/31
2015/0363996 A1 * 12/2015 Keilwert ............. G07F 17/3209 463/31
2016/0231773 A1 * 8/2016 Inoue ....................... A63F 13/24
2017/0354868 A1 * 12/2017 Kaneko ................. A63F 13/235
2017/0361222 A1 * 12/2017 Tsuchiya ................. A63F 13/24
2018/0043248 A1 * 2/2018 Ogasawara ........... A63F 13/211
2018/0043270 A1 * 2/2018 Ogasawara ............. A63F 13/22
2021/0038998 A1 * 2/2021 Tallarico ................. A63F 13/90

* cited by examiner

*Primary Examiner* — Sunit Pandya
(74) *Attorney, Agent, or Firm* — Karin L. Williams; Alan D. Kamrath; Mayer & Williams PC

(57) ABSTRACT

A contactless game controller includes a direction panel, at least one direction module, a button-simulating panel and at least one button-simulating panel. The direction panel is supported on the game machine and includes at least one direction-indicating window. The direction module is located under the direction panel corresponding to the direction-indicating window and electrically connected to the control box. The button-simulating panel is supported on the game machine and includes at least one button-simulating window. The button-simulating module is located under the button-simulating panel corresponding to the button-simulating window and electrically connected to the control box.

6 Claims, 8 Drawing Sheets

CONTACTLESS GAME CONTROLLER

BACKGROUND OF INVENTION

1. Field of Invention

The present invention relates to a game machine and, more particularly, to a contactless game controller of a game machine.

2. Related Prior Art

Referring to FIG. 8, a typical game machine 90 includes a game controller 91 supported on a shell 92. The game controller 91 includes a joystick 912 and at least one button 914.

The joystick 912 and the button 914 are electrically connected to a control box 93 inserted in the shell 92 of the game machine 90. A user uses the joystick 912 to provide a control signal to the control box 93. The user uses the button 914 to provide a button signal to the control box 93. On receiving the control signal from the joystick 912 and/or the button signal from the button 914, the control box 93 controls the proceeding of games executed in the game machine 90.

As discussed above, the user uses joystick stick 912 and push the button 914 to control the game machine 90. The user has to use his or her hands to pivot the joystick 912 and push the button 914. Viruses and germs can be transmitted via the joystick 912 and/or the button 914.

The present invention is therefore intended to obviate or at least alleviate the problems encountered in the prior art.

SUMMARY OF INVENTION

It is the primary objective of the present invention to provide a game machine with a contactless game controller.

To achieve the foregoing objective, the contactless game controller includes a direction panel, at least one direction module, a button-simulating panel and at least one button-simulating panel. The direction panel is supported on the game machine and includes at least one direction-indicating window. The direction module is located under the direction panel corresponding to the direction-indicating window and electrically connected to the control box. The button-simulating panel is supported on the game machine and includes at least one button-simulating window. The button-simulating module is located under the button-simulating panel corresponding to the button-simulating window and electrically connected to the control box.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
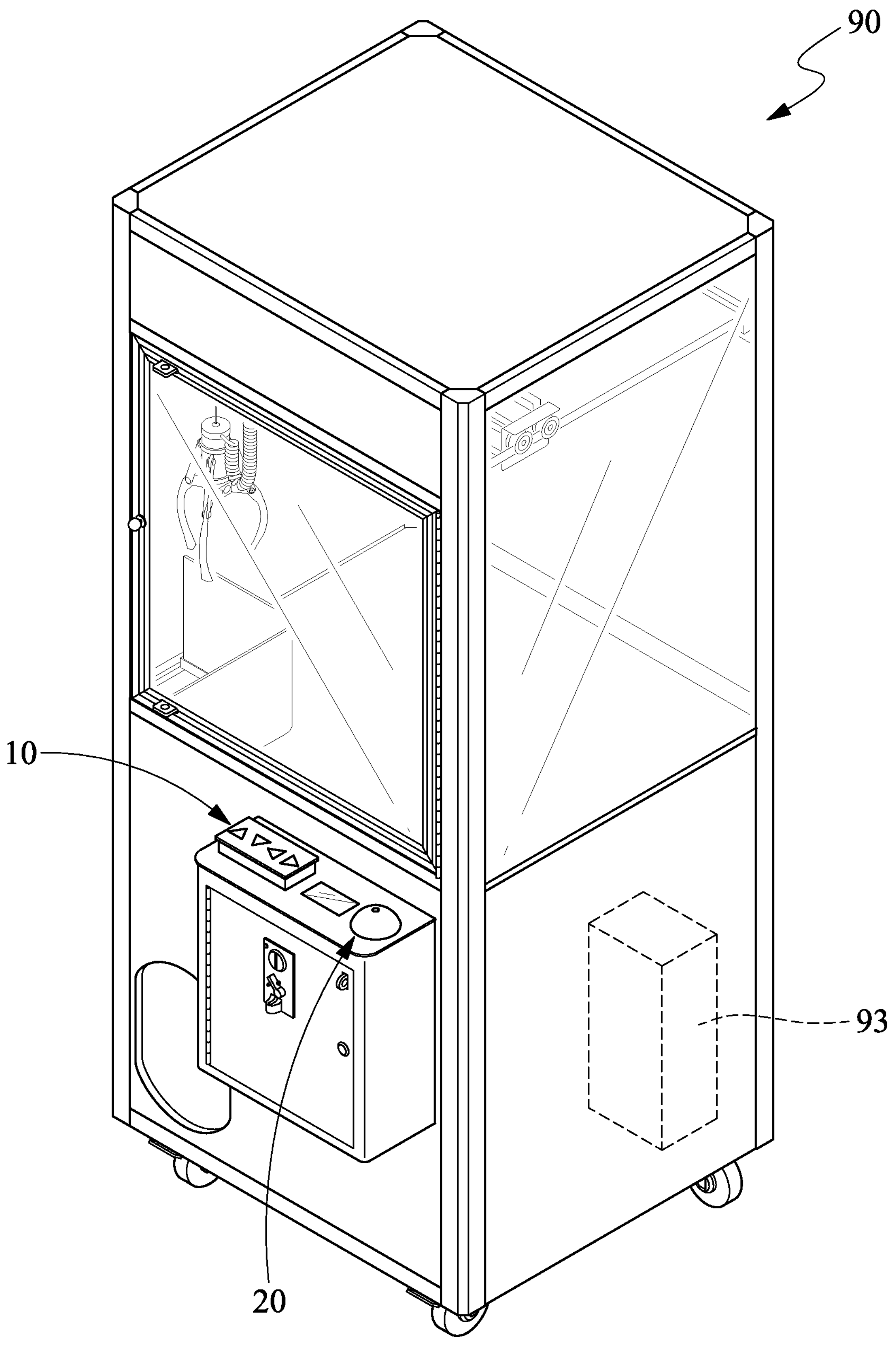
FIG. 1 is a perspective view of a game machine provided with a contactless game controller according to the first embodiment of the present invention.
Figure 2:
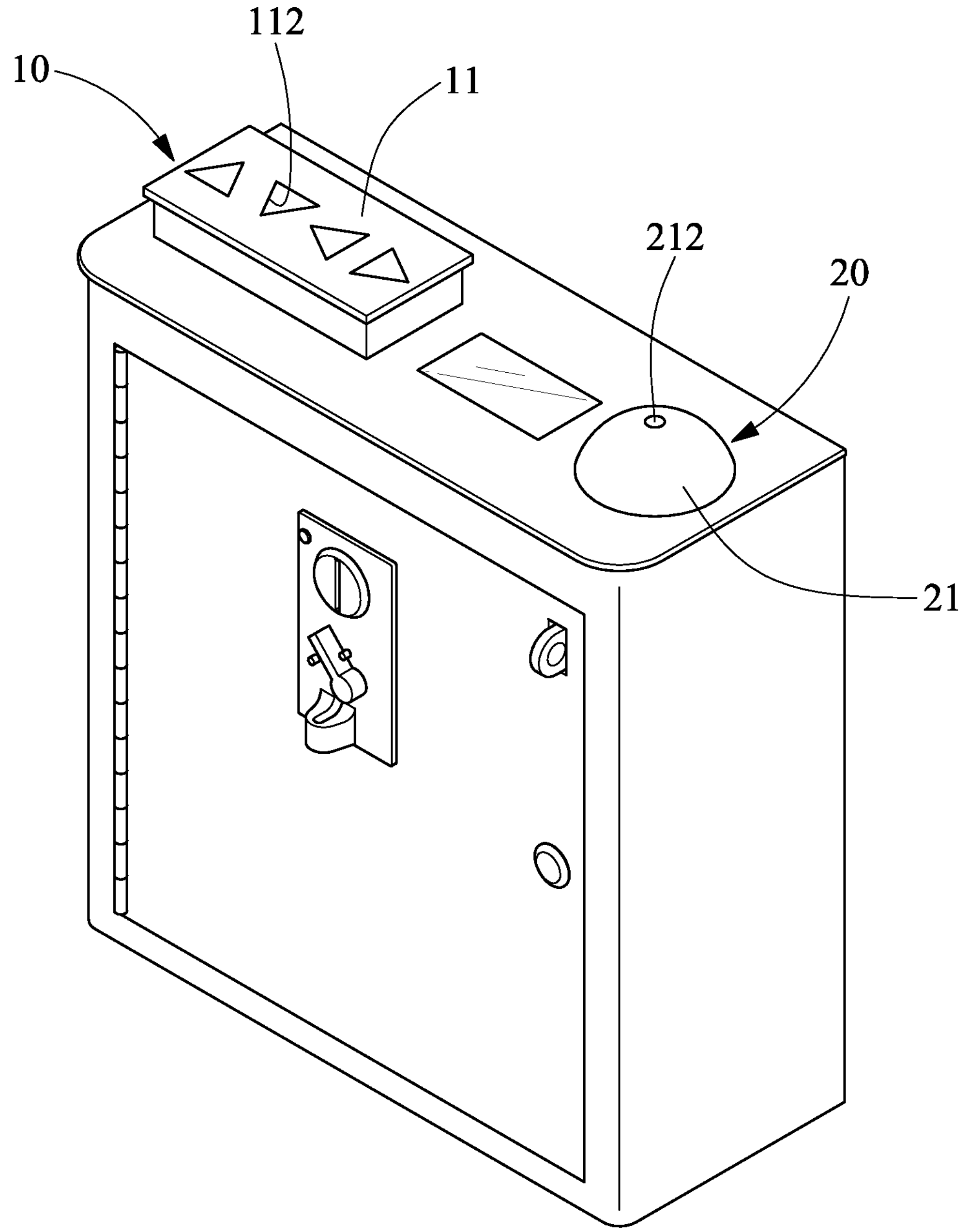
FIG. 2 is a perspective view of the contactless game controller shown in FIG. 1.
Figure 3:
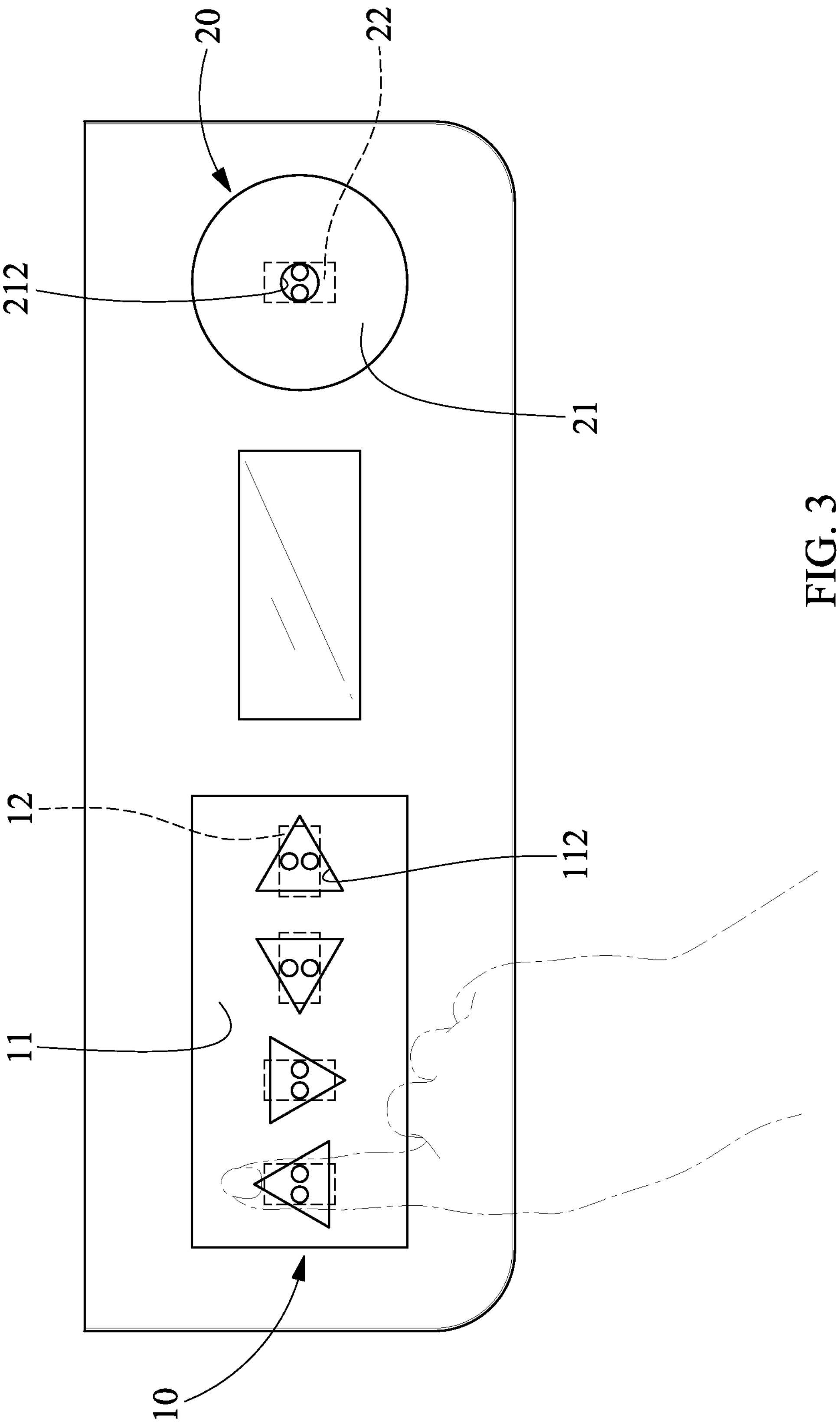
FIG. 3 is a top view of the contactless game controller shown in FIG. 2.
Figure 4:
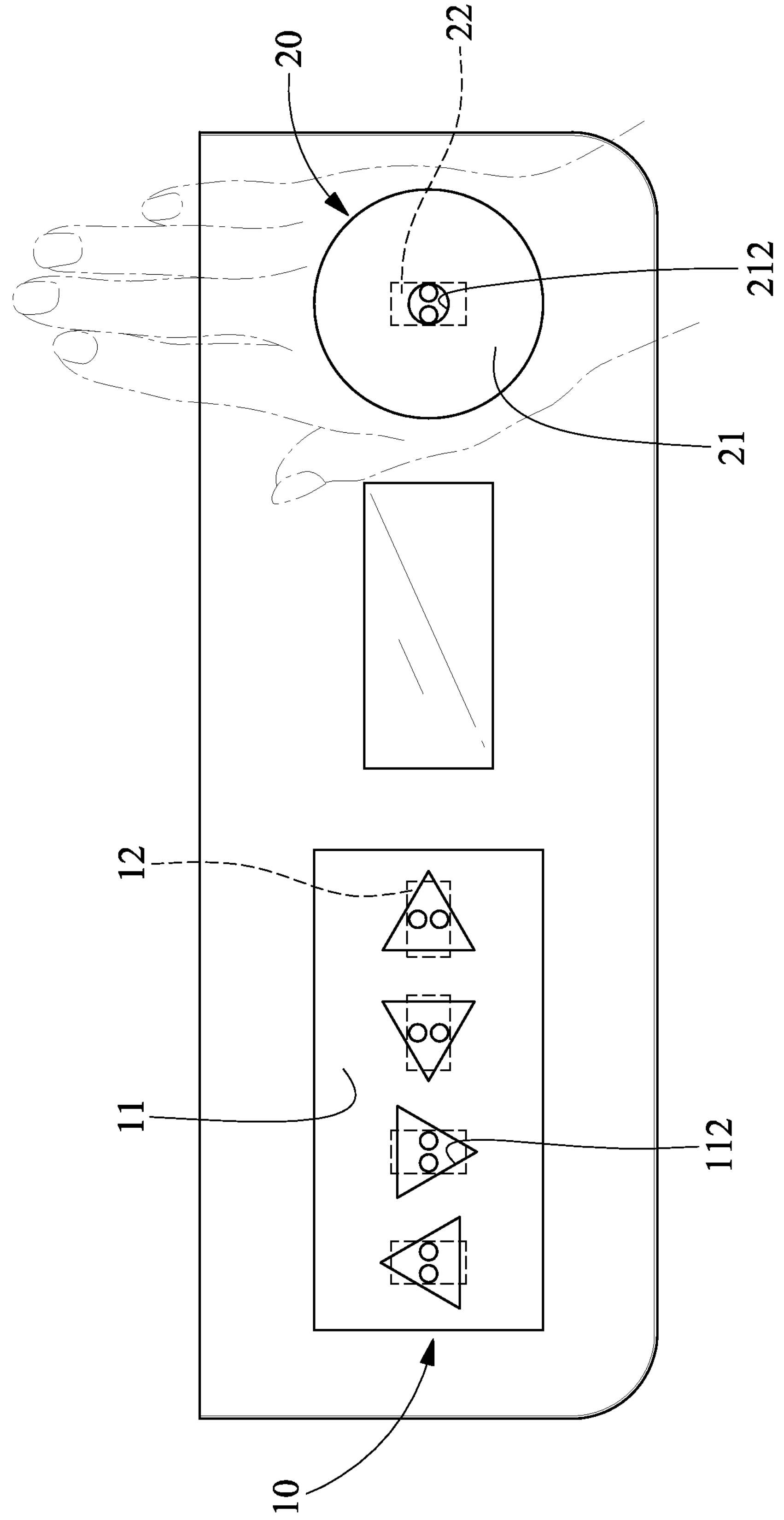
FIG. 4 is a top view of a right hand over the contactless game controller shown in FIG. 3.

Referring to FIGS. 1 through 3, a game machine 90 is provided with a contactless game controller according to a first embodiment of the present invention. The contactless game controller is connected to a control box 93 inserted in the game machine 90. The contactless game controller includes a direction device 10 and a selection device 20.

The direction device 10 includes a direction panel 11 and at least one direction module 12.

The direction panel 11 is supported on a portion of the game machine 90 to facilitate operation of the direction panel 11. The direction panel 11 includes at least one direction-indicating window 112 on an upper face. The direction panel 11 preferably includes multiple direction-indicating windows 112. The direction-indicating windows 112 are in the shape of a triangle or an arrow head.

Preferably, there are multiple direction modules 12 located under the direction panel 11 corresponding to the direction-indicating windows 112. The direction modules 12 are electrically connected to the control box 93 of the game machine 90. The direction modules 12 are active infrared sensors actuated by the control box 93 of the game machine 90 to emit direction-related light at a predetermined frequency. Moreover, the direction modules 12 receive reflected direction-related light and accordingly send a control signal to the control box 93 of the game machine 90.

The selection device 20 includes at least one button-simulating panel 21 and at least one button-simulating module 22.

The button-simulating panel 21 is supported on a portion of the game machine 90 to facilitate operation of the button-simulating panel 21. The button-simulating panel 21 includes at least one button-simulating window 212 on an upper face. The button-simulating module 22 is located under the button-simulating panel 21 corresponding to the button-simulating window 212. The button-simulating module 22 is electrically connected to the control box 93 of the game machine 90. The button-simulating module 22 is an active infrared sensor actuated by the control box 93 of the game machine 90 to emit button-related light. Moreover, the button-simulating module 22 receives reflected button-related light and accordingly sends a button signal to the control box 93 of the game machine 90.

The configuration of the contactless game controller has been described above. The operation of the contactless game controller will be described later.

Referring to FIGS. 1 through 4, a user puts his or her hand above the direction-indicating windows 112 of the direction device 10 to control the game machine 90.

When the hand is located above the direction-indicating windows 112, the hand reflects direction-related light emitted from the direction modules 12 through the direction-indicating windows 112. The direction modules 12 receives the reflected direction-related light and accordingly sends a control signal to the control box 93 of the game machine 90 to control the game machine 90.

The user operates the selection device 20 similarly. The user puts his or her hand above the button-simulating window 212 of the button-simulating panel 21. The hand reflects button-related light emitted from the button-simulating window 212 of the button-simulating module 22. The button-simulating module 22 receives the reflected button-related light and accordingly sends a button signal to the control box 93 of the game machine 90 to control the game machine 90.

Figure 5:
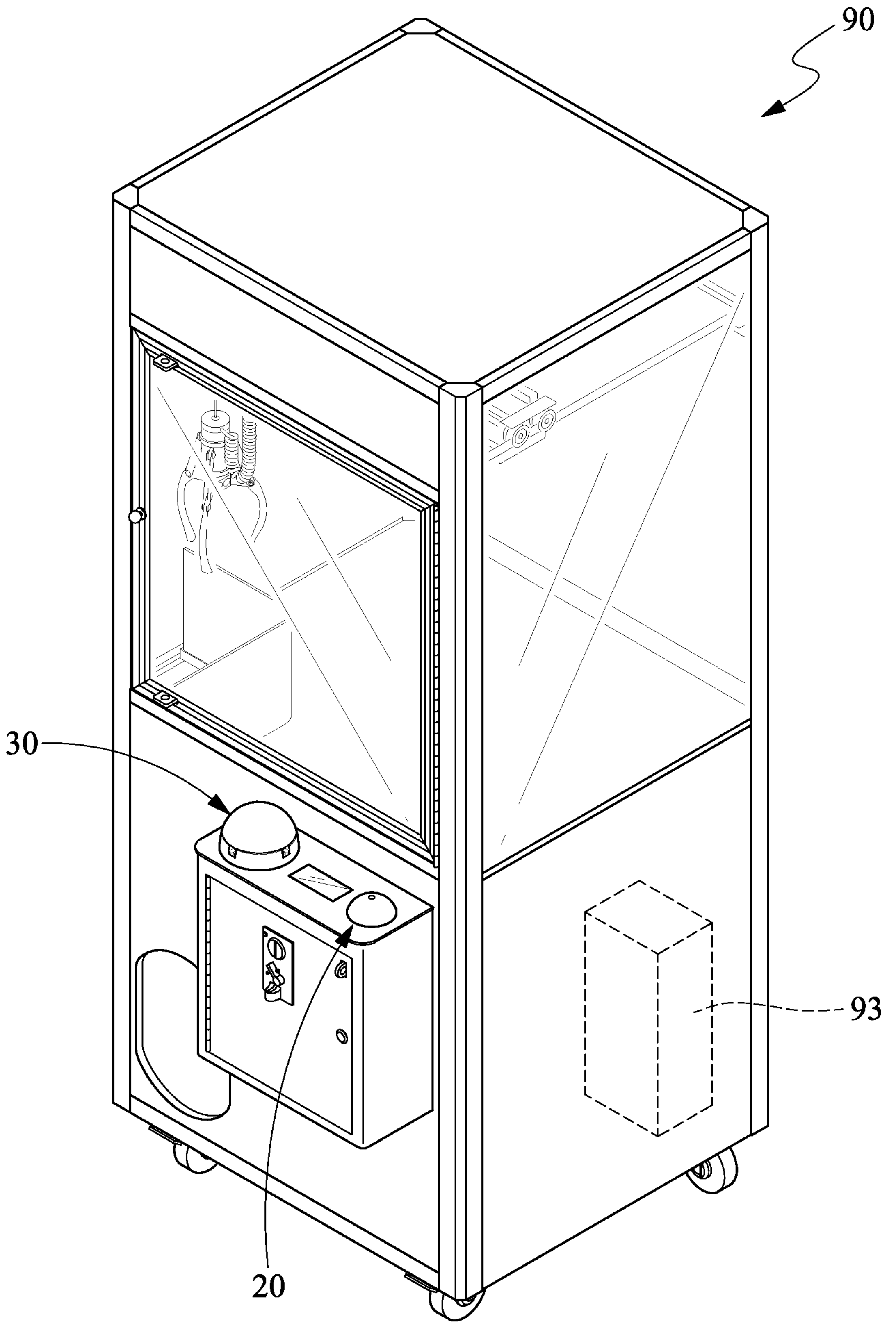
FIG. 5 is a perspective view of a game machine provided with a contactless game controller according to the second embodiment of the present invention.
Figure 6:
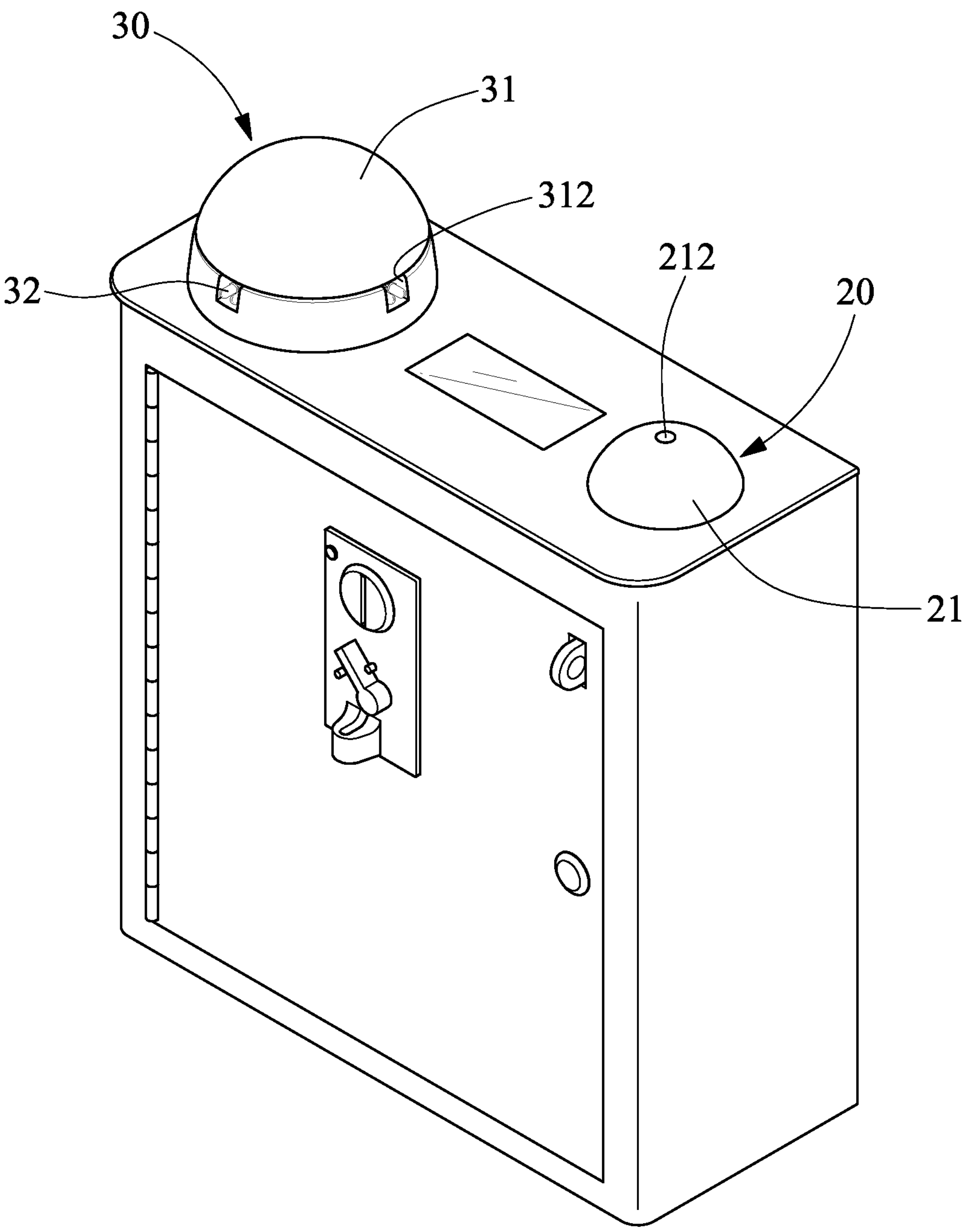
FIG. 6 is a perspective view of the contactless game controller shown in FIG. 5.
Figure 7:
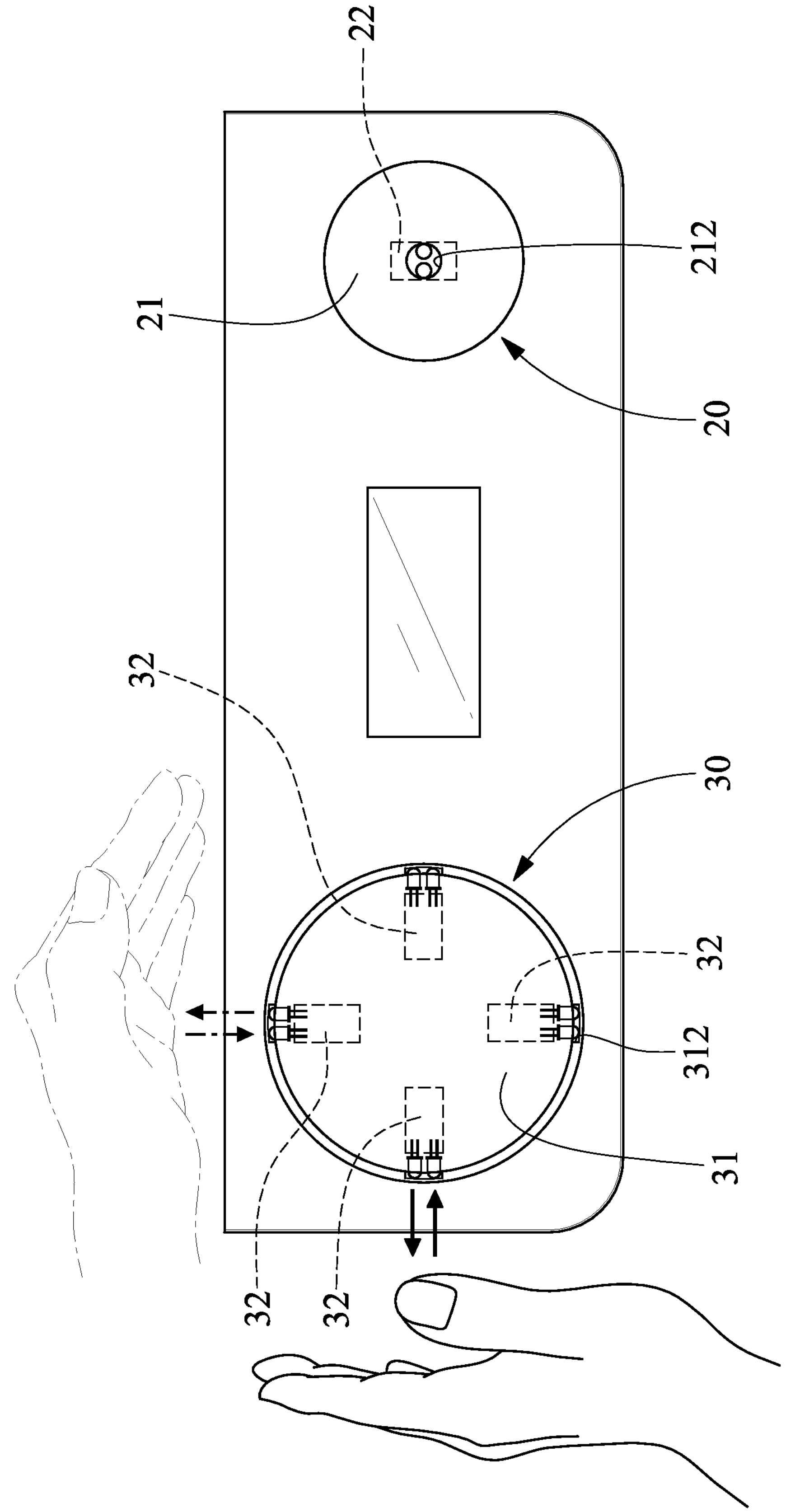
FIG. 7 is a top view of a left hand around the contactless game controller shown in FIG. 6.
Figure 8:
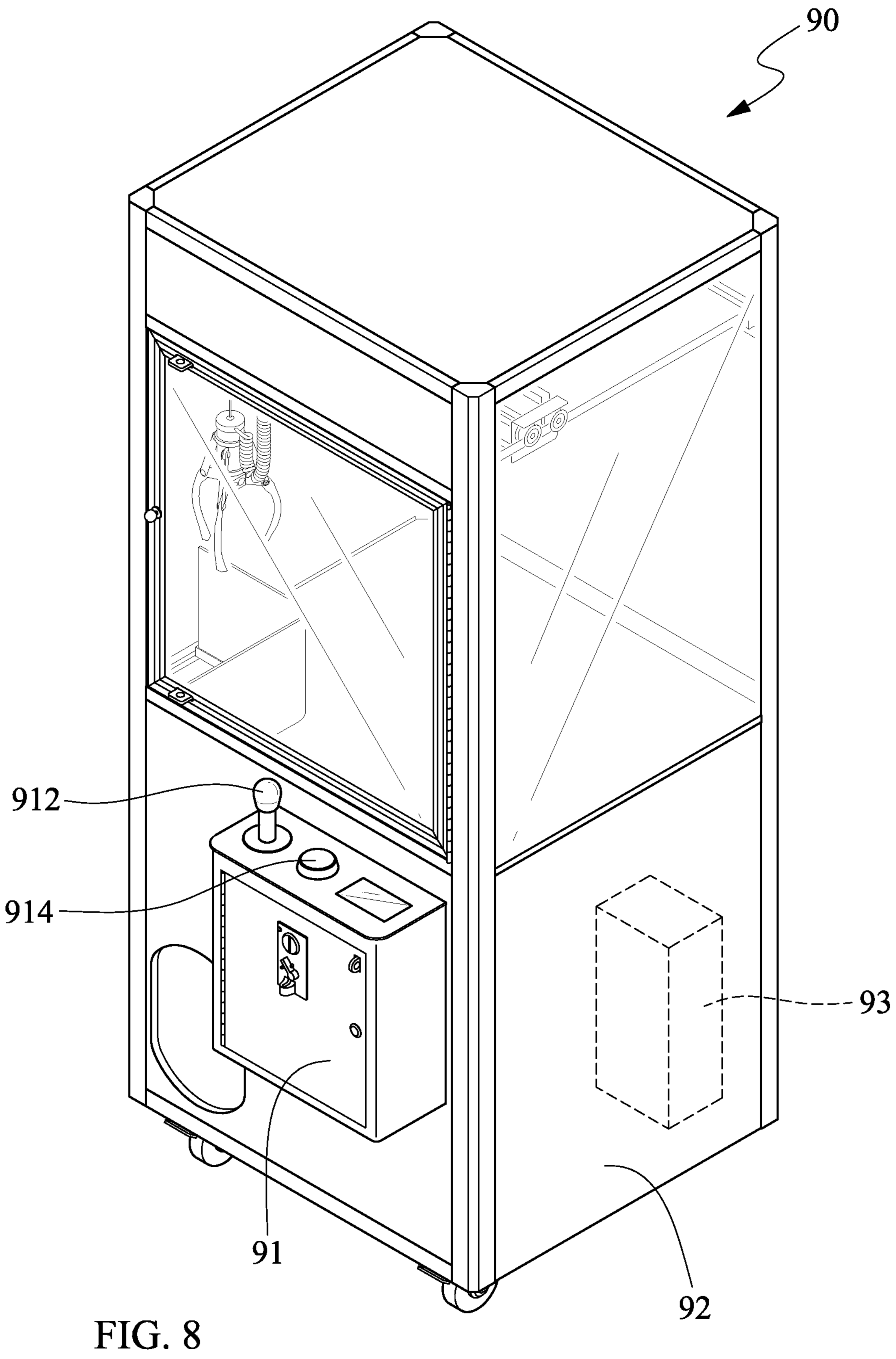
FIG. 8 PRIOR ART
FIG. 8 is a perspective view of a game machine provided with a conventional game controller.

Referring to FIG. 5 through 7, there is shown a contactless game controller according to a second embodiment of the present invention. The second embodiment is identical to the first embodiment except for including a direction device 30 instead of the direction device 10. The direction device 30 includes a direction dome 31 and at least one direction module 32.

The direction dome 31 is supported on a portion of the game machine 90 to facilitate operation of the direction dome 31. The direction dome 31 includes at least one direction-indicating window 312. The direction dome 31 preferably includes multiple direction-indicating windows 312.

Preferably, there are multiple direction modules 32 is located under the direction dome 31 corresponding to the direction-indicating windows 312. The direction modules 32 are electrically connected to the control box 93 of the game machine 90. The direction modules 32 are active infrared sensors actuated by the control box 93 of the game machine 90 to emit direction-related light at a predetermined frequency. The direction modules 32 receives reflected direction-related light and accordingly sends a control signal to the control box 93 of the game machine 90.

The operation of the direction device 30 is similar to the operation of the direction device 10 and will not be described in detail.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A contactless game controller electrically connected to a control box of a game machine, the contactless game controller comprising:

a direction dome supported on the game machine, wherein the direction dome comprises at least one direction-indicating window on a periphery;

at least one direction module located under the direction dome corresponding to the direction-indicating window and electrically connected to the control box;

a button-simulating panel supported on the game machine, wherein the button-simulating panel comprises at least one button-simulating window; and at least one button-simulating module located below the button-simulating panel corresponding to the button-simulating window and electrically connected to the control box, wherein there are two direction-indicating windows supported on left and right sides of the direction dome, wherein there are two direction modules corresponding to the direction-indicating windows.

2. The contactless game controller according to claim 1, wherein the at least one direction module is an active infrared sensor.

3. The contactless game controller according to claim 1, wherein the at least one button-simulating module is an active infrared sensor.

4. A contactless game controller electrically connected to a control box of a game machine, the contactless game controller comprising:

a direction dome supported on the game machine, wherein the direction dome comprises at least one direction-indicating window on a periphery;

at least one direction module located under the direction dome corresponding to the direction-indicating window and electrically connected to the control box;

a button-simulating panel supported on the game machine, wherein the button-simulating panel comprises at least one button-simulating window; and at least one button-simulating module located below the button-simulating panel corresponding to the button-simulating window and electrically connected to the control box, wherein there are four direction-indicating windows supported on left, right, front and rear sides of the direction dome, wherein there are four direction modules corresponding to the direction-indicating windows.

5. The contactless game controller according to claim 4, wherein the at least one direction module is an active infrared sensor.

6. The contactless game controller according to claim 4, wherein the at least one button-simulating module is an active infrared sensor.

* * * * *